United States Patent
Sonntag et al.

(10) Patent No.: US 9,262,356 B2
(45) Date of Patent: Feb. 16, 2016

(54) ARBITER DEVICE AND ARBITRATION METHOD

(75) Inventors: Soren Sonntag, Munich (DE); Helmut Reinig, Isen (DE)

(73) Assignee: Lantiq Beteiligungs-GmbH & Co.KG, Neubiberg (DE)

(*) Notice: Subject to any disclaimer, the term of this patent is extended or adjusted under 35 U.S.C. 154(b) by 1956 days.

(21) Appl. No.: 11/640,535

(22) Filed: Dec. 15, 2006

(65) Prior Publication Data

US 2008/0147944 A1 Jun. 19, 2008

(51) Int. Cl.
*G06F 12/00* (2006.01)
*G06F 13/362* (2006.01)

(52) U.S. Cl.
CPC .................... *G06F 13/362* (2013.01)

(58) Field of Classification Search
USPC .......... 710/111, 113, 114, 116, 309, 240–244
See application file for complete search history.

(56) References Cited

U.S. PATENT DOCUMENTS

| | | | |
|---|---|---|---|
| 5,280,591 A | 1/1994 | Garcia et al. | |
| 5,301,333 A | 4/1994 | Lee | |
| 5,515,523 A | 5/1996 | Kalkunte et al. | |
| 6,032,218 A | 2/2000 | Lewin et al. | |
| 6,148,002 A | 11/2000 | Patel et al. | |
| 6,434,641 B1 | 8/2002 | Haupt et al. | |
| 6,543,000 B1 * | 4/2003 | Wright | 713/500 |
| 6,570,403 B2 | 5/2003 | Liu et al. | |
| 6,763,418 B1 | 7/2004 | Chou et al. | |
| 6,971,033 B2 | 11/2005 | Ma | |
| 7,107,376 B2 * | 9/2006 | Asano et al. | 710/117 |
| 7,260,688 B1 * | 8/2007 | Baxter et al. | 711/147 |
| 7,275,119 B2 * | 9/2007 | Clark | 710/35 |
| 7,478,183 B2 * | 1/2009 | Pathak et al. | 710/116 |
| 7,533,206 B2 * | 5/2009 | Murakami et al. | 710/113 |
| 2003/0146073 A1 | 8/2003 | Cummings et al. | |
| 2003/0223453 A1 | 12/2003 | Stoler et al. | |
| 2003/0227932 A1 | 12/2003 | Meempat et al. | |
| 2004/0133724 A1 | 7/2004 | Chae | |
| 2004/0210696 A1 | 10/2004 | Meyer et al. | |
| 2004/0250003 A1 | 12/2004 | Chang | |

FOREIGN PATENT DOCUMENTS

JP 2003256358 A 9/2003

OTHER PUBLICATIONS

Computer Dictionary 3rd edition, Microsoft Press, 1997, p. 28.*

* cited by examiner

*Primary Examiner* — Nimesh G Patel

(57) ABSTRACT

An arbiter device arbitrating resource requests received at a plurality of input ports is proposed, which comprises an arbiter circuit that selects an input port to which a resource request is to be granted and successively grants a number of resource requests received at the selected input port.

30 Claims, 9 Drawing Sheets

ARBITER DEVICE AND ARBITRATION METHOD

FIELD OF THE INVENTION

The present invention generally relates to an arbiter device for arbitrating resource requests and a corresponding method of arbitrating resource requests.

BACKGROUND OF THE INVENTION

Arbiter devices and arbitration methods are usually employed in situations in which several devices are in competition for a shared resource. Typical examples for such situations, in which arbiter devices are employed, include processor bus systems which connect on chip one or several masters, such as different processors, to one or several slaves, such as internal or external memories or memory controllers, registers, coprocessors or similar, programmable electronic devices in which several applications performed by a processor or several processors attempt to simultaneously access the same resource, or routing data received at several data inputs to one data output, e.g., in a router or data switch. FIG. 1 shows an exemplary arbiter device 1, in which resource requests received at three inputs 2-4 compete with each other for accessing a bus 5. If only a single resource request is received at a time, there is no conflict and the resource request is granted. However, if several requests are simultaneously received or are simultaneously pending at the inputs 2-4, the arbiter device 1 has to select in a fair manner which of the resource requests is to be granted. For this purpose, an arbiter circuit 6 comprised by the arbiter device 1 performs an arbitration method.

Conventionally, the arbitration method performed by the arbiter circuit comprises methods such as First Come First Served (FCFS), Round Robin (RR), or Last Come First Served (LCFS). These methods may further be combined with preemption, i.e., a resource request currently granted is interrupted when another resource request having higher priority is received. The arbitration method employed may be selected as appropriate for the contemplated use of the arbiter device. In Round Robin arbitration, one resource request is successively granted to each of the inputs at which resource requests are received in an alternating or Round Robin fashion. Turning to the exemplary arbiter device of FIG. 1 and assuming that resource requests are received at each of inputs 2, 3 and 4, one resource request received at input 2 will be granted first, then one resource request received at input port 3 will be granted, and subsequently one resource request received at input 4 will be granted. Thereafter, the method is repeated starting at input 2. As may be seen in this example, the Round Robin arbitration may involve frequent changes of an active input, i.e., of the input to which resource requests are granted. The changes of the active input may, in turn, result in an increased latency if the bus 5 is coupled to a device having increasing latency times associated with a change of the master accessing the device.

BRIEF SUMMARY OF THE INVENTION

An arbiter device comprises a plurality of input ports, each of said plurality of input ports to receive resource requests. The arbiter device further comprises a first storage unit to store an indicator for a number of successive resource requests. Furthermore, the arbiter device comprises an arbiter circuit to arbitrate said resource requests, said arbiter circuit coupled to said plurality of input ports and to said first storage unit. Said arbiter circuit selects an input port of said plurality of input ports and successively grants a number of resource requests received at said input port. In addition, said arbiter circuit determines said number of successively granted resource requests according to said indicator.

DETAILED DESCRIPTION OF THE INVENTION

Figure 1:
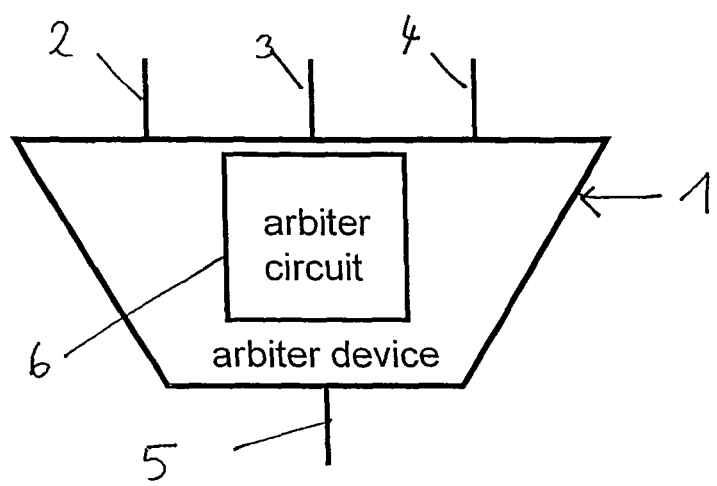
FIG. 1 schematically illustrates an arbiter device.

In the following, exemplary embodiments of the present invention will be described in detail. It is to be understood that the following description is given only for the purpose of illustrating various principles of the invention and is not to be taken in a limiting sense. Rather, the scope of the invention is defined only by the appended claims and is not intended to be limited by the exemplary embodiments described hereinafter.

It is also to be understood that, in the following description of exemplary embodiments, any direct connection or coupling between two functional blocks, devices, components, or other physical or functional units shown in the drawings or described herein could also be implemented by an indirect connection or coupling.

Further, it is to be understood that the features of the various exemplary embodiments described hereinafter may be combined with each other, unless specifically noted otherwise.

The various embodiments of the invention generally relate to arbiter devices and methods of arbitrating resource requests. An arbiter device according to an embodiment comprises a plurality of input ports, each to receive resource requests, a first register unit storing an indicator for a number of successive resource requests to be granted to an input port, and an arbiter circuit to arbitrate the resource requests. The arbiter circuit selects an input port of the plurality of input ports to successively grant a number of resource requests received at the predetermined input port. The arbiter circuit determines the number of granted resource requests according to the indicator.

An arbiter device according to another embodiment comprises a plurality of input ports, each to receive resource requests, a register unit storing a credit information for each of the plurality of input ports, and an arbiter circuit to arbitrate the resource requests. The arbiter circuit selects one input port based on the credit information and successively grants a number of resource requests received at the one input port, the number of resource requests successively granted being independent of a credit information for any input port other than the one input port.

A method of arbitrating resource requests according to an embodiment comprises the steps of providing a plurality of input ports, receiving resource requests at the plurality of input ports, selecting an input port according to selection criteria, providing an indicator for a number of successive resource requests to be granted to the input port and successively granting a number of resource requests received at the input port, the number being determined based on said indicator.

A method of arbitrating resource requests according to another embodiment of the invention comprises the steps of providing a plurality of input ports, providing a credit information for each of the plurality of input ports, providing a priority information for each of the plurality of input ports, selecting an input port of the plurality of input ports in dependence on the priority information, retrieving a credit information for the input port and successively granting a number of resource requests received at the input port, the number being limited in dependence on the credit information for the input port.

A computer program product according to an embodiment of the invention has stored thereon instructions which, when executed by a processor of an electronic device, which electronic device comprises a plurality of input ports, direct the electronic device to receive resource requests at the plurality of input ports, select an input port according to selection criteria, provide an indicator for a number of successive resource requests to be granted to the input port and to successively grant a number of resource requests received at the input port which is determined based on said indicator.

According to an embodiment of the invention, a number of resource requests received at one input port is successively granted. The embodiment has the advantage that the number of resource requests which originate from the same master are granted in succession, which may in turn lead to a decrease in latency times. Another embodiment has the advantage that a given number of successive resource requests is granted at an input port.

Hereinafter, embodiments of the invention will be described in more detail with reference to the drawings.

Figure 2:
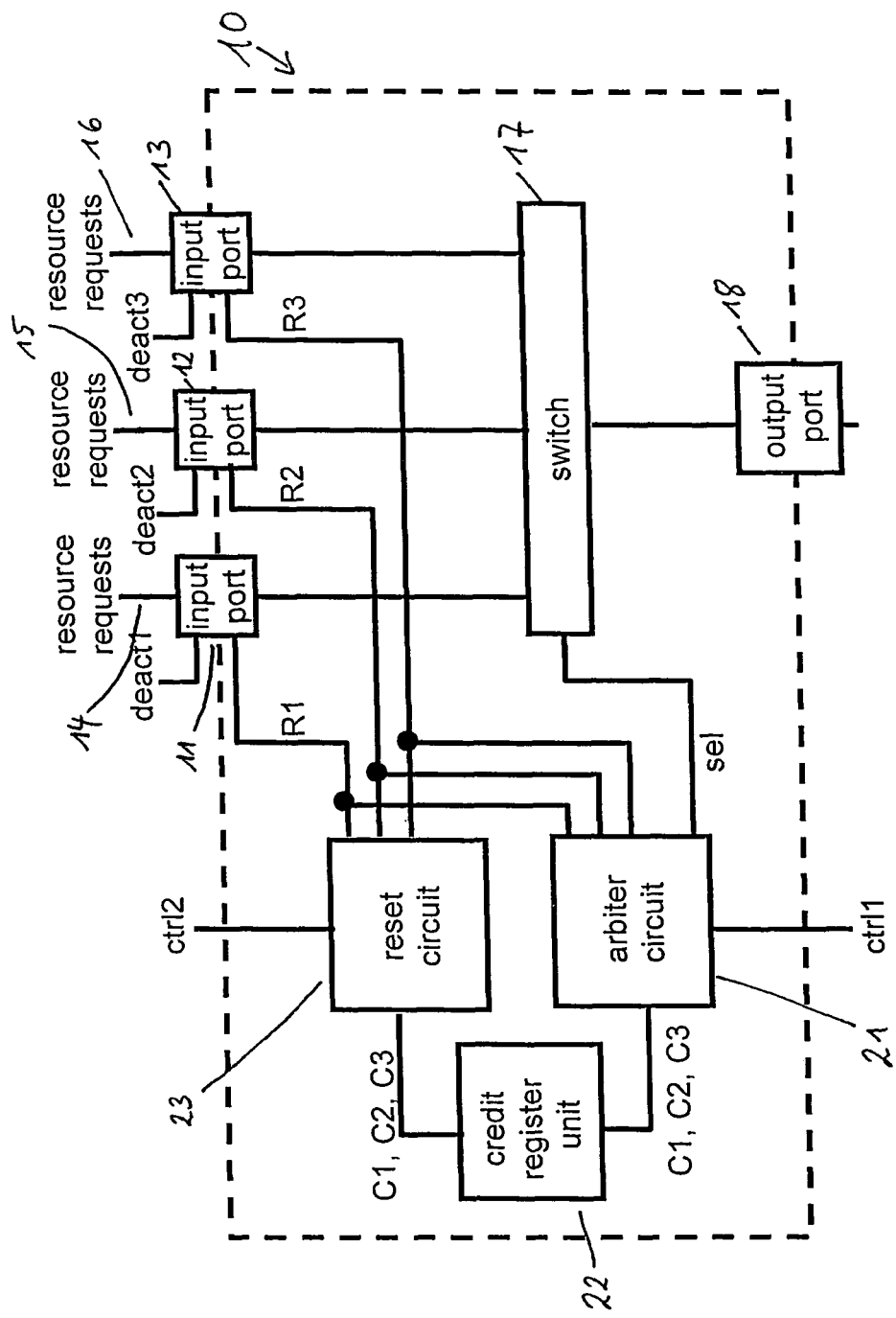
FIG. 2 is a schematic block diagram representation of an arbiter device according to an embodiment of the invention.

FIG. 2 is a schematic block diagram representation of an arbiter device according to an embodiment of the invention. The arbiter device is generally indicated at 10 and comprises a plurality of input ports 11-13 (three in the example shown), each to receive resource requests via data connections 14-16, respectively. Each of the input ports 11-13 has a data output connected to a corresponding input of a switch 17 for outputting the resource request received at the respective input port 11-13 to the switch 17. Each of the input ports further comprises a control input for receiving a control signal which, in the exemplary embodiment of FIG. 2, is a deactivation signal deact1-deact3 to be explained in more detail below. Each of the input ports 11-13 further comprises an additional output for outputting a signal R1-R3, respectively, indicative of whether a resource request is being received at the input port. The signal R1 output at the output of input port 11 has the value "1" (or true) if a resource request is received at input port 11, and has the value "0" (or false) otherwise. Correspondingly, R2 and R3 have the value "1" if a resource request is received at the respective input port, and are "0" otherwise.

By means of the signals deact1-deact3, the operation of the input ports 11-13 may be externally configured to a certain extent. For example, when one of the signals deact1-deact3 has the value "1", resource requests received at the respective input port are discarded, i.e., the input port is masked and effectively switched off. In one embodiment, this is achieved by outputting a signal R1, R2 or R3, respectively, having the value 0 irrespective of whether resource requests are being received at the input port. According to another embodiment, resource requests are not outputted from the input port to the switch 17 if the corresponding signal deact1-deact3 has the value "1".

The switch 17 is a controllable switch having a control input. Depending on a signal received at the control input, one of the input signals of switch 17 is output to an output port 18 of the arbiter device 10. The switch 17 may be constituted by a multiplexer, for example. The control input of the switch 17 is coupled to an arbiter circuit 21 to be described more fully below to receive a signal sel therefrom which is indicative of the input port that is selected to be active.

The arbiter circuit 21 is coupled to each of the input ports 11-13 to receive the signals R1-R3 therefrom and to a credit register unit 22. The credit register unit 22 has stored therein a credit information associated with each one of the input ports 11-13, typically in the form of a numerical value (hereinafter referred to as "credits" of the respective input port). The arbiter circuit 21 retrieves the credits C1-C3 associated with input ports 11-13, respectively, from the credit register unit 22 and further re-writes the credits C1-C3 stored in the credit register unit 22. The arbiter circuit 21 generates the signal sel based on the credits C1-C3 stored in the credit register unit 22. In one embodiment, the arbiter circuit 21 determines which of the input ports 11-13 at which resource requests are being received has maximum credits and selects this input port to represent the active input port. Once the input port has been selected, the arbiter circuit 21 successively grants a number of resource requests received at this input port, wherein the credits associated with this input port represent an upper limit on the number of successive resource requests granted. That is to say, once selected, the input port is guaranteed a given number of successive resource requests that is specified by its credits at the time when the first resource request is granted. A new active input port is selected by arbiter circuit 21 when no more resource requests are received at the input port or when the number of successive resource requests has reached the credits of the input port at the time of selection, i.e., when all credits have been used.

Figure 3:
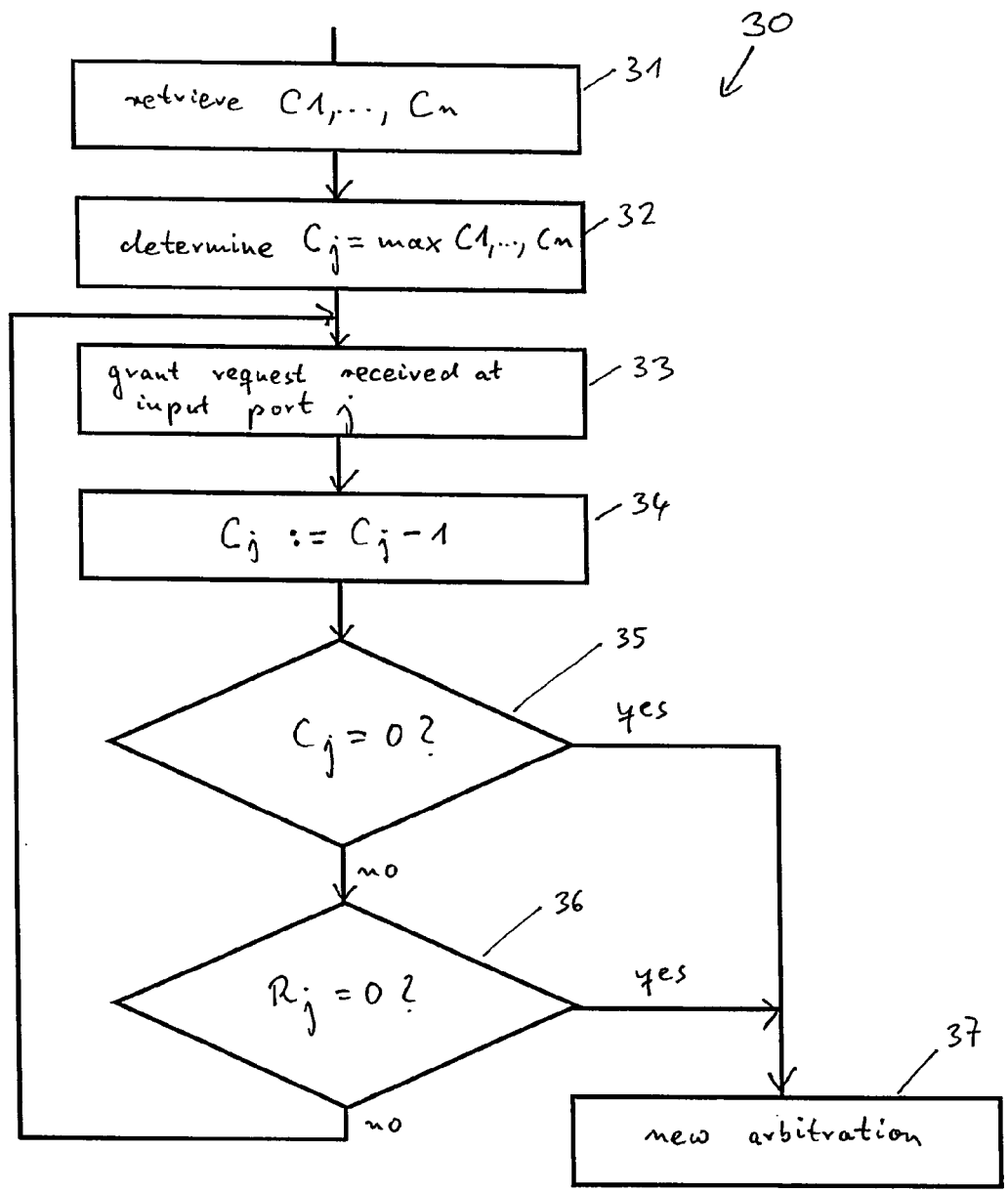
FIG. 3 is a flow diagram representation of a method of arbitrating resource requests according to an embodiment of the invention.

FIG. 3 is a flow diagram representation of a method of arbitrating resource requests according to an embodiment of the invention, which method may be performed by the arbiter circuit 21 of the arbiter device 10 of FIG. 2. The method is generally indicated at 30. It is assumed that the arbiter device has n input ports labeled 1 to n. It is further assumed that, at the time at which method 30 starts, resource requests are being received at each of the input ports. First, at step 31, the credits C1-Cn for all input ports are retrieved. If resource requests are only received at a portion of the input ports, only the credits for the input ports which currently receive resource requests are retrieved. Next, in step 32, the input port j having maximum credits is determined. At step 33, a resource request received at input port j is granted. At step 34, the credits for input port j are decremented by one. At step 35, it is determined whether all credits have been used, i.e., whether the credits associated with input port j have reached the value 0. If all credits have been used, at step 37, a new arbitration is performed. If not all credits for input port j have been used, yet, at step 36 it is determined whether a new request is already pending at input port j. If no new request is received at input port j, again, at step 37 a new arbitration is performed. Otherwise, the process returns to step 33.

To further illustrate the arbitration method of FIG. 3, the following table lists the output sel of arbiter circuit 21 for the case of three input ports and different initial credits C1-C3, assuming that new resource requests are continuously received, i.e., that R1, R2 and R3 all have value 1:

| initial values | | | sel | | | | | | |
|---|---|---|---|---|---|---|---|---|---|
| C1 | C2 | C3 | | | | | | | |
| 1 | 1 | 1 | 1 | 2 | 3 | | | | |
| 2 | 1 | 1 | 1 | 1 | 2 | 3 | | | |
| 3 | 1 | 1 | 1 | 1 | 1 | 2 | 3 | | |
| 2 | 2 | 1 | 1 | 1 | 2 | 2 | 3 | | |
| 3 | 2 | 1 | 1 | 1 | 1 | 2 | 2 | 3 | |
| 3 | 3 | 1 | 1 | 1 | 1 | 2 | 2 | 2 | 3 |

As may be seen from the above table, according to the arbitration method explained with reference to FIGS. 2 and 3, several successive resource requests are granted that are received at one input port, the number of successive resource requests granted being dependent on and configurable by the credit information of the respective input port. According to the arbitration method of the embodiment, the active input port changes less frequently than with a conventional Round Robin method, as is particularly evident for the case in which C1=3, C2=3 and C3=1. For this configuration of credits, according to the arbitration method of the embodiment, first three successive resource requests are granted at input port 1, then three successive resource requests are granted at input port 2, and finally one resource request is granted at input port 3. By contrast, for a standard Round Robin arbitration method in which the number of credits is used as an indicator of the priority of the input port, for the same configuration of credits, the input port to which a resource request is granted would alternate after each granted resource request.

Returning to FIG. 2, in order to ensure that the arbitration method continues after each of the input ports has been granted the number of resource requests initially specified by its credits, the arbiter device further comprises a reset circuit 23 that is coupled to the credit register unit 22. The reset circuit 23 monitors the credits C1-C3 presently stored in the credit register unit 22 which, as has been explained above, are decremented in correspondence with the number of granted resource requests and resets the values stored in the credit register unit 22 according to given reset criteria. In one embodiment, the reset circuit 23 resets or reloads the values stored in the credit register unit 22 to predetermined values when each of the credit values C1-C3 has reached the value zero. In another embodiment, the reset circuit 23 resets the values stored in the credit register unit 22 when (i) all credits have the value zero, or (ii) one input at which a resource request is received has zero credits, and none of the other input ports has at the same time credits and a resource request.

Figure 4:
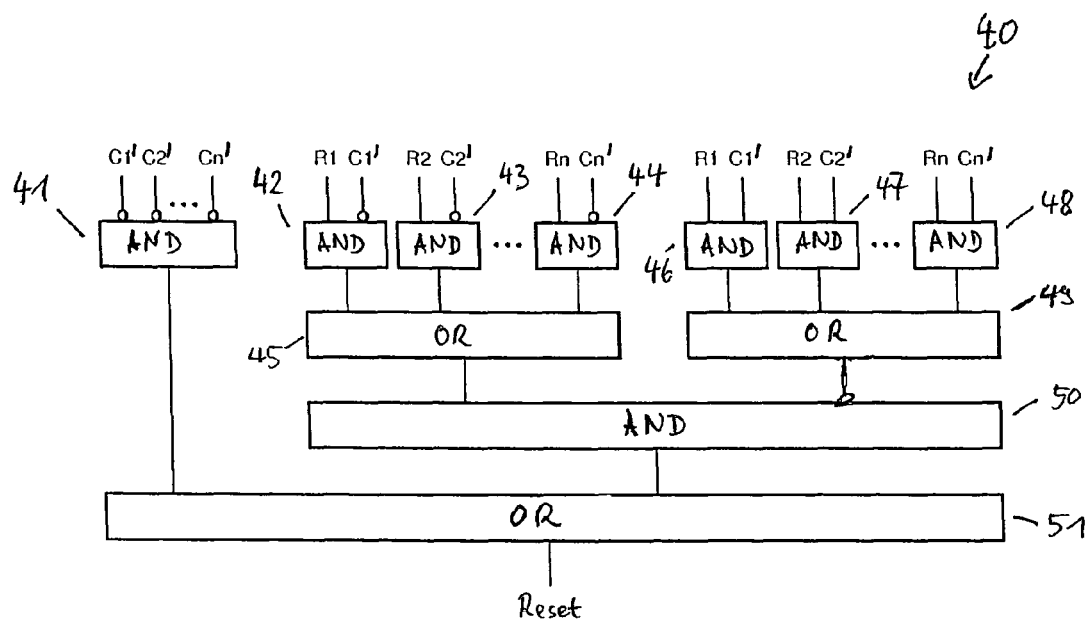
FIG. 4 is a schematic representation of reset circuit componentry that is employed in an arbiter device according to an embodiment of the invention.

FIG. 4 shows an exemplary implementation of a logical circuitry that may be employed in the reset circuit according to the latter embodiment. Considering the general case of n input ports, signals C1', . . . , Cn' are derived from the credits C1, . . . , Cn such that C1'=0 if C1=0, while C1'=1 if C1>0, and correspondingly for signals C2', . . . , Cn'. That is to say, for any input port i, Ci' has the value false or "0" if the corresponding input port does not have credits, while Ci' has the value true or 1 if the respective input port has remaining credits. The output of the AND-gate 41 is therefore true when none of the input ports has remaining credits, and is false otherwise. The logical circuit of FIG. 4 is further coupled to the input ports to receive the signals R1, . . . , Rn therefrom which are indicative of whether a resource request is received at the input ports. For every input port i, the signal Ri and NOT Ci' are coupled into an AND-gate 42-44. The output of the AND-gate 42 is true when input port 1 has a resource request but does not have credits, and is false otherwise, and correspondingly for the outputs of gates 43 and 44. The outputs of the AND-gates 42-44 are coupled to inputs of an OR-gate 45. The output of the OR-gate 45 is true if any of the input ports has resource requests but does not have credits, and is false otherwise. Further, for any input port i, the signals Ri and Ci' are input into an AND-gate 46-48, respectively. The output of AND-gate 46 is true if input port 1 both has a resource request and has credits, and is false otherwise, and correspondingly for AND-gates 47 and 48. The outputs of AND-gates 46-48 are input into an OR-gate 49. The output of the OR-gate 49 is true if any of the input ports has at the same time a resource request and credits. The output of OR-gate 45 and an inverted output of OR-gate 49 are input into an AND-gate 50. The output of the AND-gate 50 is true when at least one input port has a resource request but does not have credits and, at the same time, none of the input ports has simultaneously a resource request and credits. In other words, the output of the AND-gate 50 is true when one of the input ports has a resource request but does not have credits, while none of the other input ports has a resource request and credits. The outputs of the AND-gate 41 and of the AND-gate 50 are input to an OR-gate 51. The output of the OR-gate 51 which is indicative of whether the credit register unit is to be reset is true when none of the input ports has credits or when one input port has a resource request but no credits, while none of the other input ports has at the same time a resource request and credits.

Returning to FIG. 2, as has been indicated above, the reset circuit 23 resets the credits stored in credit register unit 22 if reset criteria are satisfied. In one embodiment, the reset circuit 23 comprises a reset value register having stored therein reset values which are written into the credit register unit 22 when the reset criteria are satisfied. In one embodiment, the reset values are fixedly stored in the reset value register. In another embodiment, the reset values stored in the reset value register are configurable, for example via a control signal ctrl2 that is coupled into the reset circuit 23.

In addition to externally configuring the reset values to which the credits are reset by the reset circuit, the operation of the arbiter device of FIG. 2 may also be externally controlled by a control signal ctrl1 that is received by arbiter circuit 21. In one embodiment, the arbiter circuit 21 performs the arbitration method explained above when the signal ctrl1 is false, but continues to grant resource requests received at the presently active input port if the signal ctrl1 is true, i.e., the current selection of the active input port is "frozen" when ctrl1 is true. In other embodiments, the operation of the arbiter circuit may be controlled by the control signal ctrl1 in various different aspects.

Figure 5:
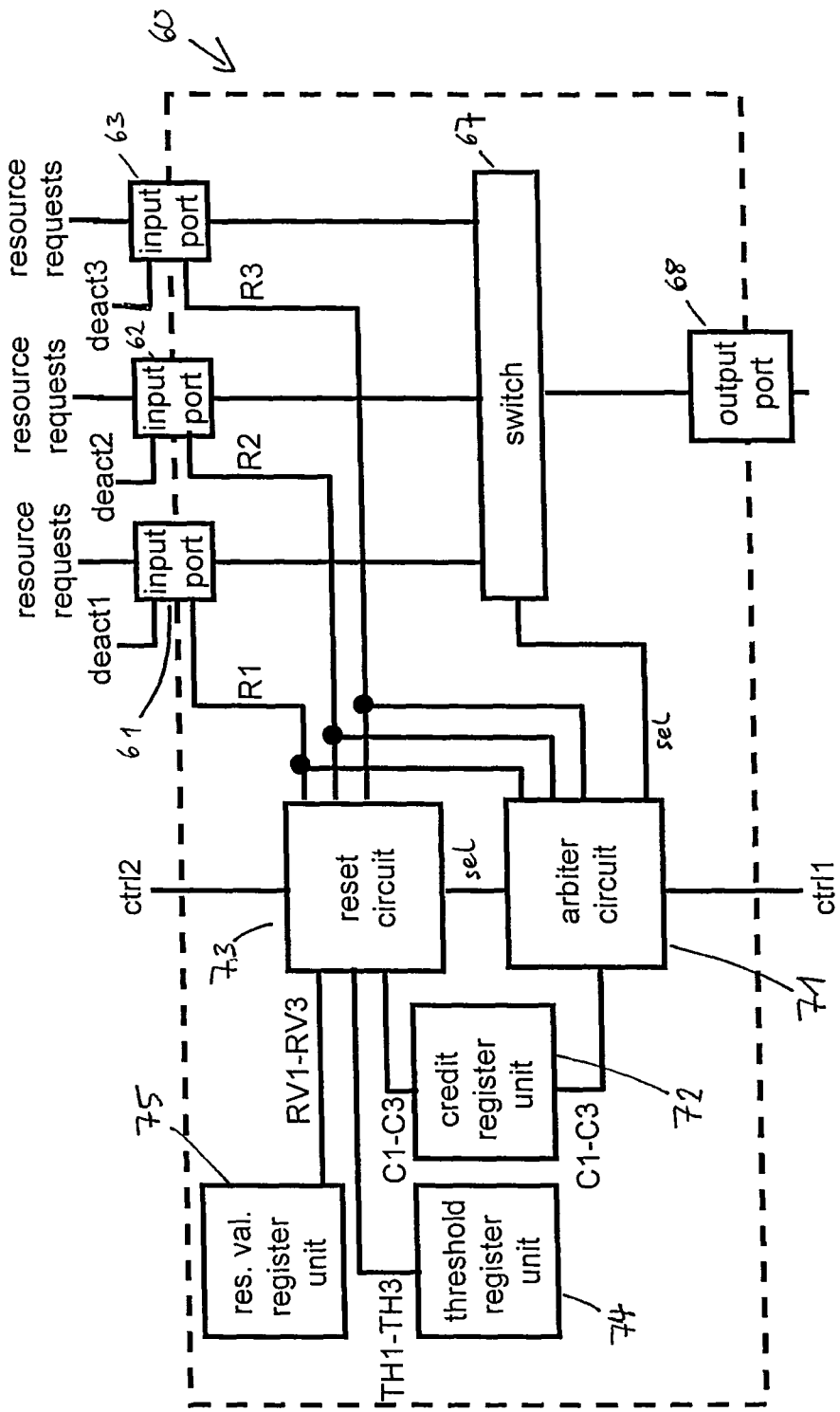
FIG. 5 is a schematic block diagram representation of an arbiter device according to another embodiment of the invention.

FIG. 5 is a schematic block diagram representation of an arbiter device 60 according to another embodiment of the invention. The configuration, coupling and operation of input ports 61-63, switch 67, output port 68, arbiter circuit 71, and credit register unit 72 is identical to the one of the various embodiments described with reference to FIG. 2 above. The arbiter device 60 further comprises a reset circuit 73 that is again coupled to the credit register unit 72. The arbiter device further comprises a threshold register unit 74 and a reset value register unit 75. As will be explained in more detail below, the threshold register unit 74 has stored therein a threshold value TH1-TH3 associated with each of input ports 61-63. The threshold value for one or several of the input ports may be retrieved from the threshold register unit 74 by the reset circuit 73 which compares the respective threshold value to the credits of the associated input port and, depending on the result of the comparison, takes an action which will be described below. The reset value register unit 75 has stored therein a reset value RV1-RV3 associated with each of input ports 61-63, respectively, which reset value is retrieved from the reset value register unit 75 by reset circuit 73 and is written into the credit register unit when the reset circuit resets one or several of the credits stored in the credit register unit. In one embodiment, the values stored in the threshold register unit 74 and in the reset value register unit 75 are externally controllable via the control signal ctrl2 received at the reset circuit 73. Responsive to such a control signal, the reset circuit 73 writes corresponding new data into the threshold register unit 74 or the reset value register unit 75.

The operation of the reset circuit 73 of the arbiter device 60 will be explained next. The reset circuit 73 retrieves the values for the credits for input ports 61-63 from the credit register unit 72. The reset circuit 73 further retrieves the signals R1-R3 from input ports 61-63. Based on the credits C1-C3 and the signals R1-R3, the reset circuit 73 resets the credits stored in the credit register unit according to the reset criteria explained with reference to FIG. 2 above, i.e., when none of the input ports has credits or when one of the input ports has a resource request but does not have credits, while none of the other input ports has at the same time credits and a resource request. In this case, the credits for each of input ports 61-63 are reset or reloaded. In addition, however, the reset circuit 73 also resets the credits of the presently active input port based on a comparison of the credits of the active input port and the threshold value of the active input port. More specifically, the reset circuit 73 is coupled to the arbiter circuit 71 to receive the signal sel therefrom which indicates the currently active input port. When a new input port j is selected, the reset circuit 73 retrieves the threshold value THj from the threshold register unit 74 and the corresponding credits Cj at the time at which the new input port j is selected from the credit register unit 72. When the credits Cj at the time at which the new input port j is selected are less than or equal to the corresponding threshold value THj, the reset circuit 73 resets the value Cj stored in the credit register unit 72. In one embodiment, this may be achieved in that the reset circuit 73 retrieves the corresponding reset value RVj from the reset value register unit 75 and resets the credit value Cj to RVj. In other embodiments, the reset circuit 73 may reset the credits Cj according to other methods, e.g., by incrementing the credits Cj by a predetermined amount. After the reset circuit 73 has thus reset the credits Cj in the credit register unit, the arbiter circuit 71 again grants a number of successive requests to the active input port.

Figure 6:
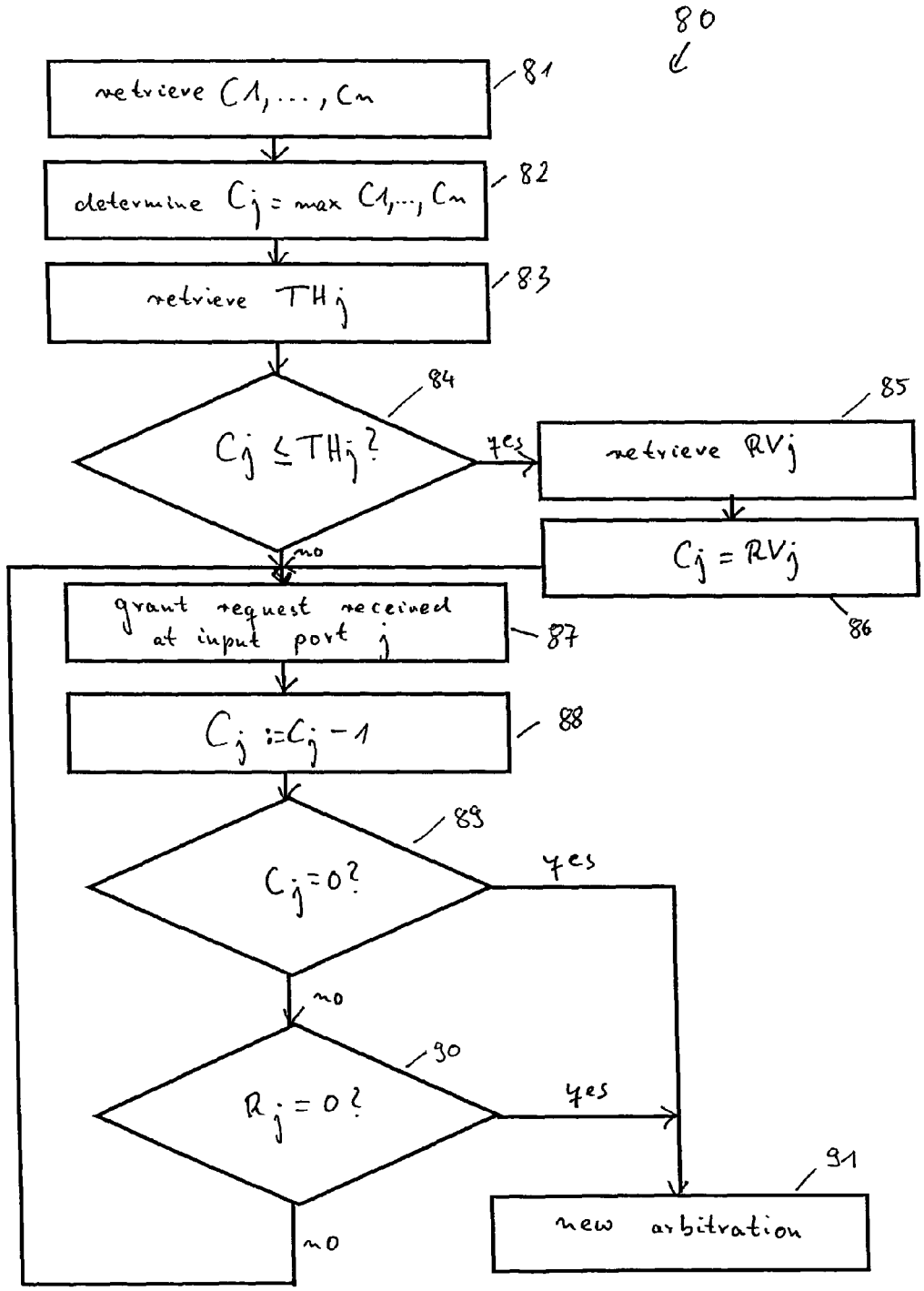
FIG. 6 is a flow diagram representation of a method of arbitrating resource requests according to another embodiment of the invention.

FIG. 6 is a schematic flow diagram representation of an arbitration method according to an embodiment of the invention. In particular, the method that is generally indicated at 80 may be performed by the arbiter circuit 71 and the reset circuit 73 of FIG. 5. Again, it is assumed that at the start of method 80 resource requests are received at each of n input ports. First, at step 81, the credits C1, . . . , Cn associated with each of the input ports are retrieved. More generally, if resource requests are received only at a portion of the input ports, at step 81, only the credits are retrieved that are associated with the input ports at which resource requests are received. Next, at step 82, the input port j having maximum credits is determined. At step 83, the corresponding threshold value THj is retrieved. At step 84, the credits Cj associated with the input port at the time of its selection are compared to the threshold value THj. If the credits Cj are less than or equal to THj, at step 85, the reset value RVj is retrieved and, at step 86, the credits Cj are set equal to the reset value RVj. The method then proceeds to step 87. Similarly, if the credits Cj are found to be larger than the threshold value THj at step 84, the method directly proceeds to step 87. At step 87, a resource request received at the active input port j is granted. At step 88, the credits Cj are decremented by one. At step 89, it is determined whether the credits have been used, i.e., whether Cj=0. If the credits have been used, a new arbitration is performed at step 91. Otherwise, at step 90 it is determined whether a new resource request has been received at the active input port j. If this is not the case, i.e., if Rj=0, a new arbitration is performed at step 91. Otherwise, the method returns to step 87. In one embodiment, the new arbitration performed at step 91 comprises a step of determining whether the credits for all input ports have been used, i.e., whether the credits have the value 0 for every input port, or whether a resource request is received at the presently still active input port, while none of the other input ports has at the same time credits and a resource request, and resetting the credits C1, . . . , Cn associated with all input ports if this is the case.

An advantage associated with the arbiter device according to the embodiment of FIG. 5 and of the arbitration method of the embodiment of FIG. 6 is that, since the credits of the newly selected active input port are compared to a corresponding threshold value and are incremented if the credits are less than or equal to the threshold value, the newly selected active input port is guaranteed a given number of successive requests. More specifically, a newly selected active input port is guaranteed to be granted a successive number of resource requests that is at least equal to the threshold value of the respective input port.

In another embodiment, rather than separately comparing the credits of the active input port to the respective threshold value, the threshold values are harnessed when the reset circuit determines whether all credits stored in the credit register unit are to be reset. More particularly, in the embodiment of FIG. 4, the signals C1', . . . , Cn' may also be generated so that Cj'=0 if Cj≤THj, and Cj'=1 if Cj>THj. According to the reset circuitry of FIG. 4 all credits are then reset when (i) for every input port, the credits are equal to or less than the respective threshold, or (ii) for at least one credit port that receives a resource request, the credits are equal to or less than the respective threshold, and for no other input port at which a resource request is being received, the credits are still greater than the associated threshold.

Figure 7:
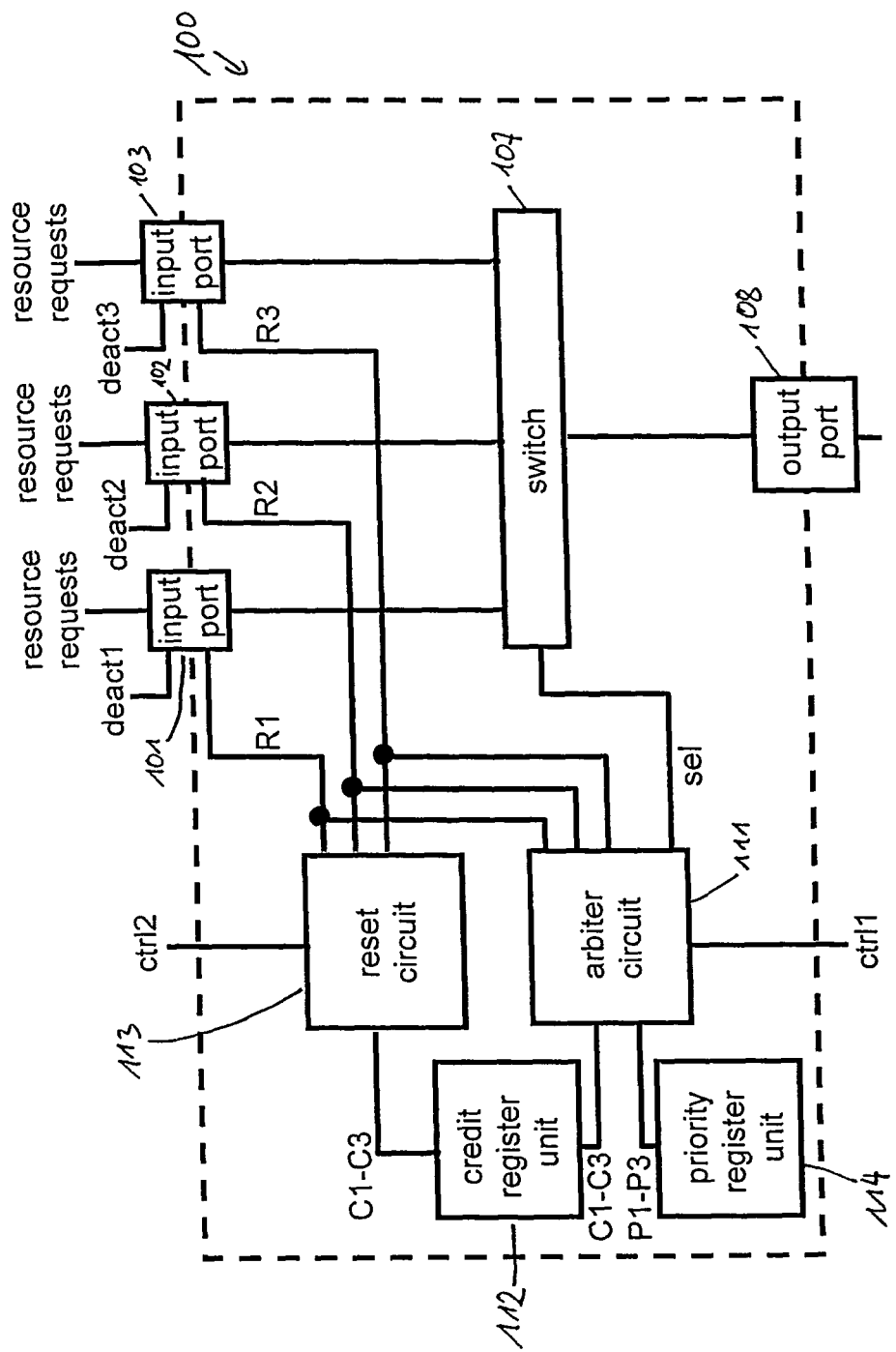
FIG. 7 is a schematic block diagram representation of an arbiter device according to yet another embodiment of the invention.

FIG. 7 is a schematic block diagram of an arbiter device 100 according to another embodiment of the invention. The arbiter device 100 comprises input ports 101-103, a switch 107, an output port 108, a credit register unit 112, and a reset circuit 113, the configuration, coupling and operation of which are identical to the ones of the corresponding elements of the arbiter devices according to the embodiments described with reference to FIGS. 2-6 above. The arbiter device 100 further comprises an arbiter circuit 111 that is coupled to the input ports 101-103 to receive signals R1-R3 indicative of whether a resource request is received at the respective input port therefrom, and to the credit register unit 112 to retrieve credit information C1-C3 associated with each of the input ports therefrom. The arbiter device further comprises a priority register unit 114 having stored therein a priority value P1-P3 associated with each of the input ports, which priority register unit 114 is coupled to the arbiter circuit 111 to provide the priorities P1-P3 thereto. In an embodiment, the arbiter circuit 111 performs the following arbitration method. First, the arbiter circuit 111 retrieves the priority information P1-P3 associated with each of the input ports from the priority register unit 114 and selects an input port, to which a resource request is to be granted, based on the priorities P1-P3. In one embodiment, the input port having maximum priority is selected. After selection of the input port, the arbiter circuit 111 retrieves the credit value associated with the input port from the credit register unit 112 and successively grants a number of resource requests received at the input port, the credits providing an upper limit for the number of successive resource requests. A signal sel output from the arbiter circuit 111 to the switch 107 is indicative of the presently active input port to which a resource request is to be granted.

Figure 8:
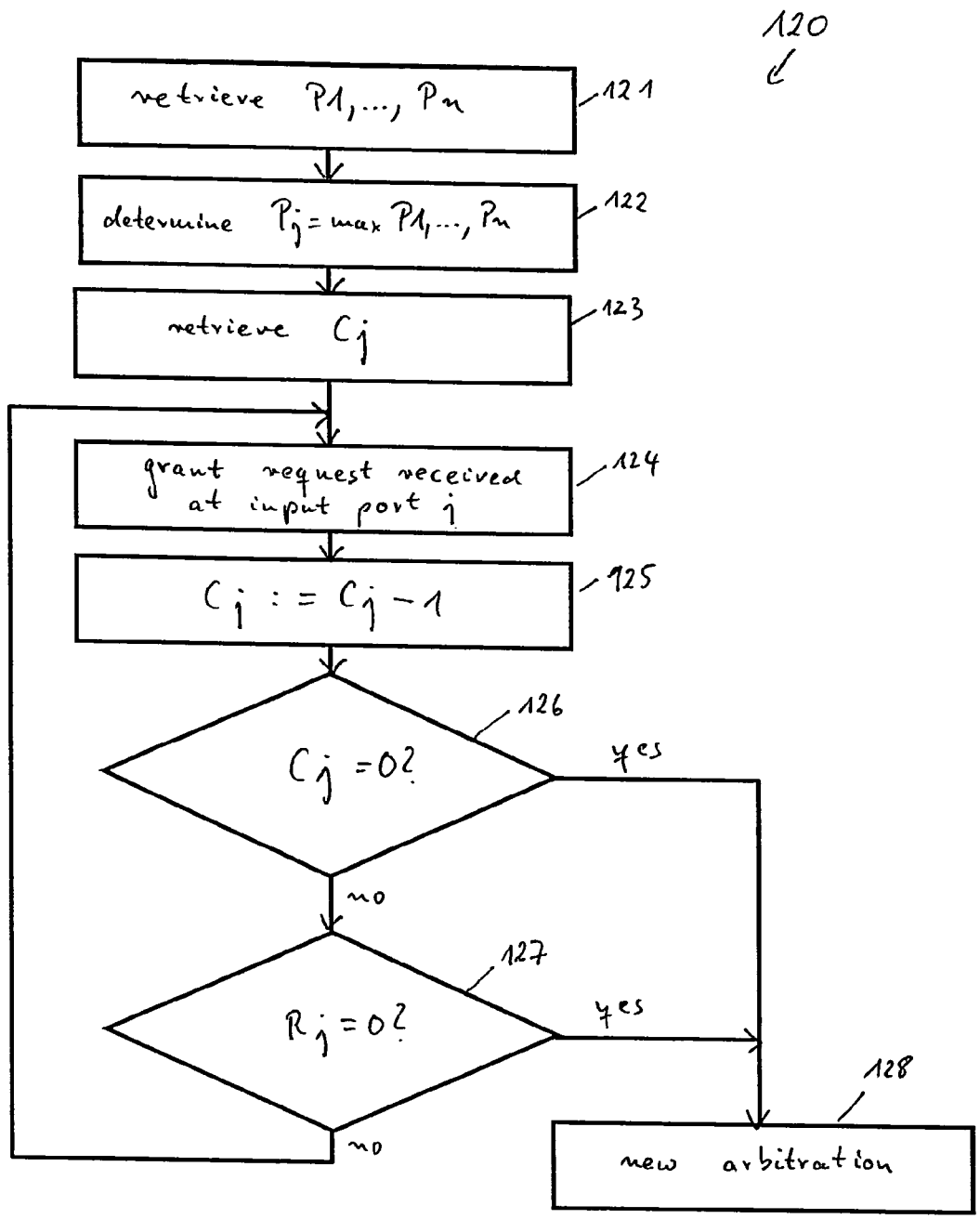
FIG. 8 is a flow diagram representation of a method of arbitrating resource requests according to yet another embodiment of the invention.

FIG. 8 is a flow diagram representation of an arbitration method according to another embodiment. The method which is generally indicated at 120 may be performed by the arbiter circuit 111 of the arbiter device 100 of FIG. 7. Again, it will be assumed that the arbiter device has n input ports for receiving resource requests and that, at the start of the method of FIG. 8, resource requests are received at each of the input ports. First, at step 121, the priorities P1, . . . , Pn associated with each of the input ports are retrieved. At step 122, the input port j having maximum priority is determined. At step 123, the credits Cj associated with the selected input port are retrieved. At step 124, a resource request received at the active input port j is granted. At step 125, the credits Cj of the input port j are decremented by one. At step 126, it is determined whether all credits associated with input port j have been used, i.e., whether Cj=0. If all credits have been used, at step 128 a new arbitration is performed. Otherwise, at step 127, it is determined whether a new resource request has been received at input port j, i.e., whether Rj=0. If no new resource request has been received, a new arbitration is performed at step 128. Otherwise, the method returns to step 124. In one embodiment, if several input ports having equal maximum priorities are determined at step 122, the active input port is selected according to a Round Robin scheme. In another embodiment, if several input ports having equal maximum priorities are determined at step 122, the credits associated with each of these input ports may be retrieved and the active input port may be selected based on both the priorities and the credits.

According to the arbiter device of the embodiment of FIG. 7 and according to the arbitration method of the embodiment of FIG. 8, while the active input port is selected based on the priorities, a number of successive resource requests is still granted to the active input port, which number is limited by the arbitration circuit according to the credits. Therefore, a number of successive resource requests may still be granted to an active input port.

A priority register as explained with reference to FIG. 7 above may also be integrated with any one of the embodiments explained with reference to FIGS. 2-6.

While exemplary embodiments of the invention have been described for illustrative purposes with reference to the accompanying drawings above, many modifications and alterations of the embodiments shown in the figures are conceivable. For example, while in the embodiments described above each of the input ports comprises a control input that may be harnessed for switching off the respecting input port, one or several of these control inputs may be omitted, so that, for example, one or several of the input ports do not need to be switchable. Similarly, the control input of the arbiter circuit that allows the present selection of the active input port to be frozen may also be omitted.

Further, while various elements of the arbiter devices shown in the figures are schematically indicated as blocks representing functional entities, such as the arbiter circuit, the reset circuit, the credit register unit, the threshold register unit, the reset value register unit, and the priority register unit, it is to be understood that this representation is schematical only and that two or more of these entities may be integrally formed. For example, the arbiter circuit, the reset circuit, and the credit register unit may be formed as a single integrated circuit. Similarly, the reset circuit and the credit register unit and/or the threshold register unit and/or the reset value register unit may form a single integrated circuit. Any other combination of functional entities into a single integrated circuit is also conceivable.

While in the embodiments explained in detail above the credits, threshold values and reset values are respectively stored in register units, in another embodiment, one or several of these values are stored in any other suitable storage unit. For example, in one embodiment, a storage unit is provided which stores the credits, another storage unit is provided which stores the threshold values and yet another storage unit is provided which stores the reset values.

Still further, while for example the credit register unit is schematically shown as a single block having stored therein the credits of all input ports, it is to be understood that the credit register unit may also be comprised of a plurality of registers that are provided separately from each other. For example, there may be provided a separate register storing the credits for an input port, that may be associated with this input port. The same applies to other register units referred to above, such as the reset value register unit, the threshold register unit, and the priority register unit.

While in the above exemplary embodiments the arbiter device is arranged in the data path, so that resource requests are directly routed through the arbiter device, the arbiter device may also be provided separately from, e.g., a multiplexer through which the resource requests are routed. In this case, the arbiter device may for example receive an indication of whether data is received at the various inputs of the multiplexer and may output, responsive thereto, a signal to the multiplexer that is indicative of to which of the inputs a resource request is to be granted.

Still further, in the various embodiments, the reset values to which the credits are reset as well as the threshold values corresponding to the various input ports may be chosen and configured as appropriate. Only exemplarily and for illustrative purposes, if a slave to which the resource requests are to be routed is a memory or a memory controller that operates on the basis of bursts comprising several words, it is anticipated that the threshold value for one input port may be configured to be equal to two, while the reset value may be configured to be equal to four, so that two words of a 2-word-burst received at the input port may be successively output to the slave. Similarly, the threshold value associated with an input port may be set equal to four, while the reset value may be set equal to eight, so as to ensure that four words of a 4-word-burst or two successive 2-word-bursts originating from the same master may be output to the slave. It is to be understood that these numerical values are purely illustrative. Further, as will be appreciated from this example, a resource request may, for example, correspond to a word to be transmitted to a memory controller. In particular, the size of the resource request does not need to be fixed, but may be variable.

Figure 9:
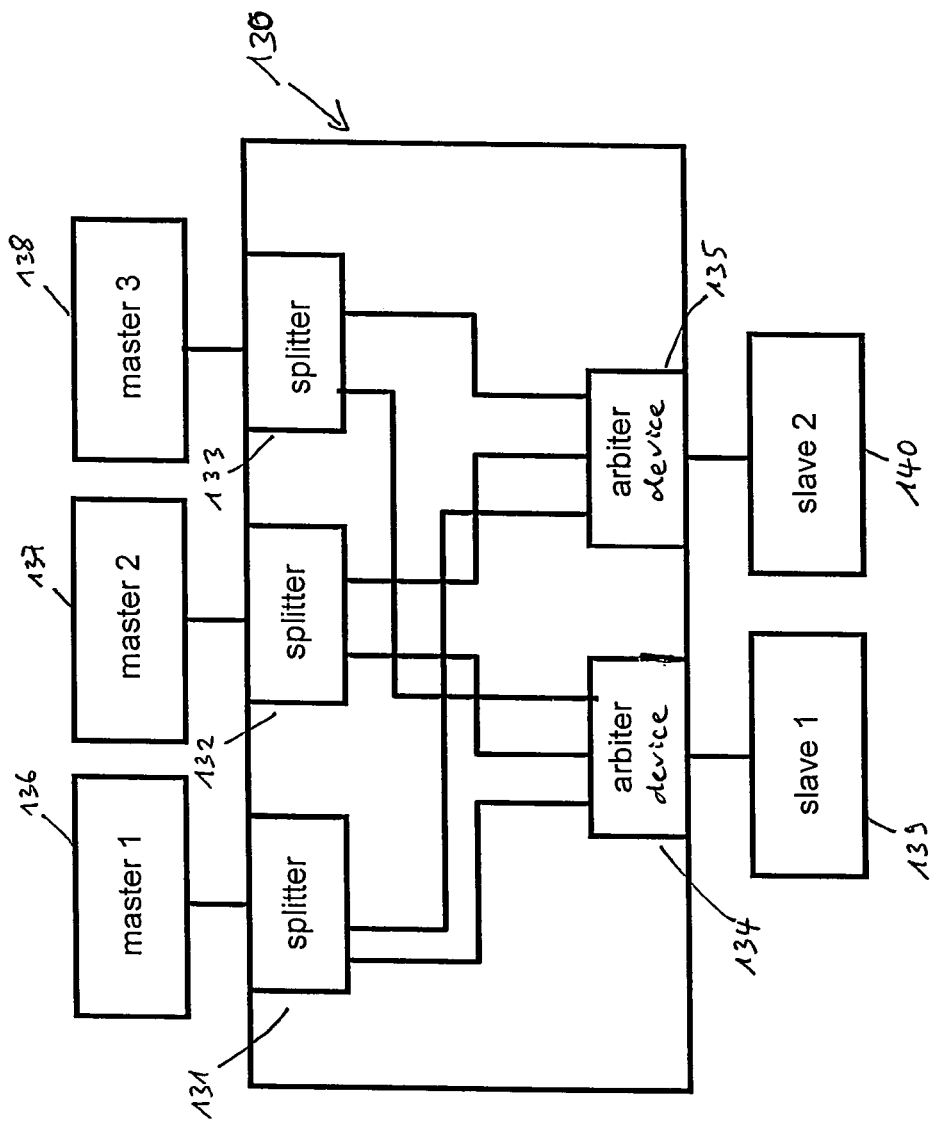
FIG. 9 is a schematic block diagram representation of a cross bar comprising an arbiter device according to an embodiment of the invention.

The arbiter devices and arbitration methods according to the various embodiments of the invention may be employed in any device or in any process in which competing resource requests have to be arbitrated. With reference to FIG. 9, an exemplary application of an arbiter device according to an embodiment of the invention will be described next.

FIG. 9 is a schematic illustration of a crossbar 130 that comprises three splitters 131-133 and two arbiter devices 134 and 135. Each of the splitters 131-133 comprises an input and two outputs, one of which is respectively coupled to arbiter device 134, while the other is coupled to arbiter device 135. The input of each of splitters 131-133 is coupled to one of three masters 136-138. The output of each of arbiter devices 134 and 135 is coupled to one of two slaves 139 and 140, respectively. Each of masters 136-138 may be hardware based, i.e., may be a physical device or entity, such as a direct memory access (DMA), or may be software based, e.g., one or several applications performed by a processor or a CPU. Similarly, each of slaves 139 and 140 may be hardware based, such as a data cache or a Double Data Rate (DDR) memory controller, or may be software based, such as a coprocessor or a special purpose processor that performs specific applications.

One or both of arbiter devices 134 and 135 may be an arbiter device according to an embodiment of the invention. In particular, when slave 139 has increased latency times when the master accessing the slave 139 changes frequently, arbiter device 134 preferably is an arbiter device according to an embodiment of the invention. Similarly, if slave 140 is a slave having increased latency times when the master accessing the slave 140 changes frequently, the arbiter device 135 will be an arbiter device according to an embodiment of the invention. When only one of slaves 139 and 140 is a slave which has increased latency times when the master changes frequently, an arbiter device according to an embodiment of the invention may be combined with a conventional arbiter device, that performs, e.g., a conventional Round Robin arbitration, in a single cross bar 130, the arbiter device and/or the arbitration method of each of the arbiter devices being appropriately chosen in dependence on the slave connected to the respective arbiter device.

Arbiter devices according to the various embodiments of the invention may also be employed in cascading arbiter structures. Also in this case, an arbiter device or several arbiter devices according to an embodiment of the invention may be combined with a conventional arbiter device or with several conventional arbiter devices to form the arbiter cascade. In one embodiment, if the arbiter cascade arbitrates resource requests for a slave that has increasing latency times as masters change frequently, an arbiter device according to an embodiment of the invention is employed at stage one of the arbiter cascade, i.e., at the stage that is proximal to the slave.

Although the foregoing embodiments of the invention have been described with respect to an arbiter device in which the various functional blocks are implemented in hardware, the functionalities of each of the functional blocks comprised by the arbiter devices may be implemented by hardware, by software, or a combination thereof. Accordingly, the invention is intended to also cover software products, such as a computer program product having stored thereon instructions which, when executed by a processor of an electronic device, directs the electronic device to perform an arbitration method according to an embodiment of the invention or to emulate an arbiter device according to an embodiment of the invention.

What is claimed is:

1. An arbiter device, comprising:
a plurality of input ports, each of said plurality of input ports for receiving resource requests,
a first storage unit for storing an indicator for a number of successive resource requests,
an arbiter circuit for arbitrating said resource requests, said arbiter circuit coupled to said plurality of input ports and to said first storage unit, wherein said arbiter circuit selects an input port of said plurality of input ports and successively grants a number of resource requests received at said input port, wherein said arbiter circuit determines said number of successively granted resource requests according to said indicator;
wherein said indicator is an indicator for a minimum number of successive resource requests to be granted when a corresponding number of resource requests is received at said input port,
wherein said arbiter circuit decrements or increments said indicator for each granted resource request at said input port, and
wherein, for each successive resource request received at said input port, said arbiter circuit compares said decremented or incremented indicator to a threshold value and, if said decremented or incremented indicator is greater than or less than said threshold value, said arbiter circuit withholds arbitration and grants said successive resource request until said decremented or incremented indicator is not greater or less than said threshold value.

2. The arbiter device of claim 1, comprising
a second storage unit for storing a second threshold value, and
a reset circuit coupled to said first storage unit and said second storage unit, wherein said reset circuit performs a comparison of said indicator and said second threshold value and resets said indicator in dependence on a result of said comparison and then successively grants said number of resource requests.

3. The arbiter device of claim 2, comprising
a third storage unit for storing a reset value,
wherein said reset circuit is coupled to said third storage and resets said indicator to said reset value.

4. The arbiter device of claim 3, comprising
a configuration input port coupled to said third storage unit to configure said reset value.

5. The arbiter device of claim 3,
wherein said first storage unit comprises a first register unit, said second storage unit comprises a second register unit and said third storage unit comprises a third register unit.

6. The arbiter device of claim 1,
wherein said arbiter circuit performs a new arbitration when said number of successively granted resource requests is equal to said indicator or when no more resource request is received at said input port.

7. The arbiter device of claim 1, comprising
an output port,
wherein, when said arbiter circuit grants a resource request, said resource request is routed to said output port.

8. The arbiter device of claim 7, comprising
a memory unit coupled to said output port.

9. The arbiter device of claim 8,
wherein said memory unit comprises a DDR-memory, a DDR2-memory or a DDR3-memory.

10. The arbiter device of claim 1,
wherein said resource requests have variable data sizes.

11. An arbiter device, comprising:
a plurality of input ports, each of said plurality of input ports for receiving resource requests,
a storage unit storing a credit information for each of said plurality of input ports, an arbiter circuit for arbitrating said resource requests, which arbiter circuit is coupled to said plurality of input ports and said storage unit, wherein said arbiter circuit selects one input port of said plurality of input ports based on said credit information and successively grants a number of resource requests received at said one input port, wherein said number of successively granted resource requests is dependent on the credit information for said one input port and is independent of the credit information for any other input port, wherein said arbiter circuit decrements or increments said credit information for each granted resource request at said one input port, and wherein, for each successive resource request received at said one input port, said arbiter circuit compares said decremented or incremented credit information to a threshold value and, if said decremented or incremented credit information is greater than or less than said threshold value, said arbiter circuit withholds arbitration and grants said successive resource request until said decremented or incremented credit information is not greater or less than said threshold value.

12. The arbiter device of claim 11, wherein said one input port which the arbiter circuit selects is an input port for which said credit information is maximum.

13. The arbiter device of claim 12, wherein said arbiter circuit performs a round-robin arbitration to select said one input port.

14. The arbiter device of claim 11, comprising a reset circuit coupled to said storage unit, wherein said reset circuit resets said credit information for at least said one input port in dependence on reset criteria.

15. The arbiter device of claim 14, comprising a threshold storage unit for storing a second threshold information for at least said one input port, wherein said reset circuit is coupled to said threshold storage unit and said reset criteria comprise comparing said second threshold information for said one input port and the credit information for said one input port.

16. The arbiter device of claim 14, wherein said reset criteria comprise determining whether each input port at which one of the resource requests is received has credit information equal to zero.

17. An arbiter device, comprising:

a plurality of input means, each of the plurality of input means for receiving resource requests, means for arbitrating said resource requests according to arbitration criteria, said means for arbitrating coupled to said plurality of input means, wherein said arbitration criteria comprise successively granting a plurality of resource requests received at one of said plurality of input means, means for storing an indicator for a minimum number of successive resource requests, wherein said means for arbitrating is coupled to said means for storing to retrieve said indicator therefrom and successively grants at least said minimum number of successive resource requests as long as resource requests are received at said input means, wherein said arbiter circuit decrements or increments said indicator for each granted resource request at said one input means, and wherein, for each successive resource request received at said one input means, said arbiter circuit compares said decremented or incremented indicator to a threshold value and, if said decremented or incremented indicator is greater than or less than said threshold value, said arbiter circuit withholds arbitration and grants said successive resource request until said decremented or incremented indicator is not greater or less than said threshold value.

18. A method of arbitrating resource requests, comprising the steps of:

providing a plurality of input ports, receiving resource requests at said plurality of input ports, selecting one of the plurality of input ports according to selection criteria, providing an indicator for a number of successive resource requests to be granted to said one of the plurality of input ports, successively granting a number of resource requests received at said one of the plurality of input ports, wherein said number of resource requests is determined based on said indicator, and decrementing or incrementing said indicator for each granted resource request at said one input port wherein said indicator is an indicator for a minimum number of successive resource requests to be granted as long as resource requests are received at said one input port, wherein, for each successive resource request received at said one input port, said decremented or incremented indicator is compared to a threshold value and, if said decremented or incremented indicator is greater than or less than said threshold value, arbitration is withheld and said successive resource request is granted until said decremented or incremented indicator is not greater or less than said threshold value.

19. The method of claim 18, comprising the step of providing a credit information for each of said plurality of input ports.

20. The method of claim 19, wherein said selection criteria comprise determining an input port for which said credit information is maximum.

21. The method of claim 20, wherein said selection criteria comprise determining whether at least two input ports have maximum credit information and performing a round-robin arbitration for said at least two input ports.

22. The method of claim 19, comprising the step of determining said indicator from said credit information for said one of the plurality of input ports.

23. The method of claim 18, comprising the steps of providing a second threshold value for said indicator, comparing said indicator to said second threshold value, and resetting said indicator when a new input port is selected in dependence on a result of said step of comparing said indicator.

24. The method of claim 18, comprising the step of determining whether said number of resource requests successively granted is equal to said indicator or whether no more resource request is received at said one input port, and performing a new arbitration in dependence on a result of said determining step.

25. The method of claim 18, wherein said step of successively granting comprises routing said successively granted resource requests to a memory device.

26. A method of arbitrating resource requests, comprising the steps of:

providing a plurality of input ports, providing a priority information for each of said plurality of input ports, selecting an input port of said plurality of input ports in dependence on said priority information, determining a credit information for said input port, successively granting a number of resource requests received at said input port, wherein said number of resource requests is granted in dependence on said credit information for any other input port, and decrementing or incrementing said credit information for each granted resource request at said input port, wherein said number of resource requests successively granted is independent of a credit information for any other input port, wherein, for each successive resource request received at said input port, said decremented or incremented credit information is compared to a threshold value and, if said decremented or incremented credit information is greater than or less than said threshold value, arbitration is withheld and said successive resource request is granted until said decremented or incremented credit information is not greater or less than said threshold value.

27. The method of claim 26, wherein said priority information is derived from said credit information.

28. A computer storage unit having stored thereon instructions which, when executed by a processor of an electronic device including a plurality of input ports, direct the electronic device to:

receive resource requests at said plurality of input ports, select an input port from the plurality of input ports according to selection criteria, provide an indicator for a number of successive resource requests to be granted to said input port, successively grant a number of resource requests received at said input port, wherein said number of resource requests is determined based on said indicator, and decrement or increment said indicator for each granted resource request at said input port, wherein said indicator is an indicator for a minimum number of successive resource requests to be granted as long as resource requests are received at said input ports, wherein, for each successive resource request received at said input port, said decremented or incremented indicator is compared to a threshold value and, if said decremented or incremented indicator is greater than or less than said threshold value, arbitration is withheld and said successive resource request is granted until said decremented or incremented indicator is not greater or less than said threshold value.

29. An electronic device, comprising:

a plurality of input ports, each of the plurality of input ports for receiving resource requests, an arbiter device for arbitrating said resource requests, the arbiter device comprising an arbiter circuit and a storage unit storing a credit information for each of said plurality of input ports and an arbiter circuit coupled to said storage unit for arbitrating said resource requests, wherein said arbiter circuit is coupled to said plurality of input ports for selecting one input port of said plurality of input ports based on said credit information and for successively granting a number of resource requests received at said one input port, wherein said number of successively granted resource requests is dependent on a credit information for said one input port and is independent of a credit information for any other input port, wherein said arbiter circuit decrements or increments said credit information for each granted resource request at said one input port, and wherein, for each successive resource request received at said one input port, said arbiter circuit compares said decremented or incremented credit information to a threshold value and, if said decremented or incremented credit information is greater than or less than said threshold value, said arbiter circuit withholds arbitration and grants said successive resource request until said decremented or incremented credit information is not greater or less than said threshold value.

30. The electronic device of claim 29, wherein said electronic device is a processor bus system, a crossbar for a processor bus system, a router, an ATM switch or an Ethernet switch.

* * * * *